United States Patent [19]
Pande

[11] Patent Number: 5,405,104
[45] Date of Patent: Apr. 11, 1995

[54] STOPPED ROTOR AIRCRAFT UTILIZING A FLIPPED AIRFOIL X-WING

[76] Inventor: John B. Pande, 11859 Casper Rd., Sandy, Utah 84092

[21] Appl. No.: 1,739

[22] Filed: Jan. 4, 1993

[51] Int. Cl.$^6$ .................. B64C 27/24; B64C 11/06; B64C 11/32
[52] U.S. Cl. ................. 244/7 A; 244/17.25; 416/114; 416/128
[58] Field of Search ........... 244/7 R, 7 C, 7 A, 12.4, 244/17.25, 23 B, 23; 416/114, 128, 129, 169 R

[56] References Cited

U.S. PATENT DOCUMENTS

| | | | |
|---|---|---|---|
| 2,037,745 | 4/1936 | Vaughn | 416/128 |
| 2,437,700 | 3/1948 | MacFarland | 416/129 |
| 3,105,659 | 10/1963 | Stutz | 244/7 R |
| 3,119,577 | 1/1964 | Andrews . | |
| 3,146,970 | 9/1964 | Girard . | |
| 3,159,360 | 12/1964 | Ryan . | |
| 3,458,160 | 7/1969 | Marchetti . | |
| 3,494,706 | 2/1970 | Gaffey et al. | 244/7 R |
| 3,515,500 | 6/1970 | Nachod . | |
| 3,586,262 | 6/1971 | Sherman | 244/7 R |
| 3,792,827 | 2/1974 | Girard . | |
| 3,938,759 | 2/1976 | Bastide . | |
| 4,059,247 | 10/1976 | Prewitt . | |
| 4,094,143 | 6/1978 | Schlegel et al. | 244/63 |

(List continued on next page.)

FOREIGN PATENT DOCUMENTS 2119974 11/1982 Germany ........................ 416/128

OTHER PUBLICATIONS

'Civil Applications of High-Speed Rotocraft and Powered-Lift Aircraft Configuration," Albers, Oct. 1987, NASA Ames, pp. 3-6, 14, 17 and 19.
'Jane's All the World's Aircraft", Jane's Publishers, 1987-88, ISBN07106-0850-0, pp. 520-521.
"X-Wing Faces a Tough Comeback", Aerospace America Magazine, Apr. 1988, pp. 8, 9 and 68.
'Is There a Practical High-Speed VTOL in the Future?", Aerospace Engineering Magazine, Oct. 1991, pp. 21-24.

Primary Examiner—Andres Kashnikow
Assistant Examiner—Virna Lissi Mojica

[57] ABSTRACT

This invention is directed to stopped rotor Flipped Airfoil X-wing (FAX-WING ™) aircraft which comprises:

(a) A rotary wing flight mode which operates similar to a helicopter, wherein all main rotor airfoils rotate with leading edges into the oncoming airstream (neglecting forward motion) to provide lift, and utilize an anti-torque rotor to cancel main rotor torque. The fixed wing flight mode, including supersonic flight, utilizes all stationary main rotor airfoils for primary lift, such that all airfoil leading edges are positioned forward, meeting the oncoming airstream generated by forward aircraft motion. Two airfoils are forward swept 45 degrees, and the other two airfoils are aft swept 45 degrees. The transition mode for converting from rotary wing to fixed wing flight, and vise-versa, causes two adjacent airfoils to flip 180 degrees (in approximately 1/16 second) about their pitch axis, such that all airfoils have leading edges in the correct orientation for a particular flight mode.

(b) Rotating flywheel inertia mass(es) capable of being coupled to the main rotor airfoils, via a flywheel clutch, for the purpose of rapidly starting or stopping airfoil angular rotation (in approximately 1 second) without applying adverse torque to the aircraft fuselage, and a spin up/spin down mechanism for applying angular momentum to the flywheel inertia mass(es) at gradual rates such that the anti-torque rotor and/or rudder can cancel torque.

(c) Computer based flight control system capable of directing rotary wing, fixed wing, and transition therebetween.

(d) Variable pitch ducted fan to provide forward thrust, coupled to common turboshaft engine(s), that also provide power to the main rotor.

11 Claims, 4 Drawing Sheets

U.S. PATENT DOCUMENTS

| | | |
|---|---|---|
| 4,604,032 | 8/1986 | Brandt et al. ............... 416/128 |
| 4,711,415 | 12/1987 | Binden . |
| 4,726,547 | 2/1988 | Zimmer . |
| 4,730,795 | 3/1988 | David . |
| 4,783,023 | 11/1988 | Jupe . |
| 4,787,573 | 11/1988 | Pauchard ................ 244/17.23 |
| 4,789,115 | 12/1988 | Koutsoupidis . |
| 4,899,957 | 2/1990 | Eickmann . |
| 4,953,098 | 8/1990 | Fischer ................... 244/17.11 |
| 4,958,786 | 9/1990 | Ogawa et al. ............ 416/114 |
| 4,965,879 | 10/1990 | Fischer, Jr. . |
| 4,980,835 | 12/1990 | Lawrence et al. . |

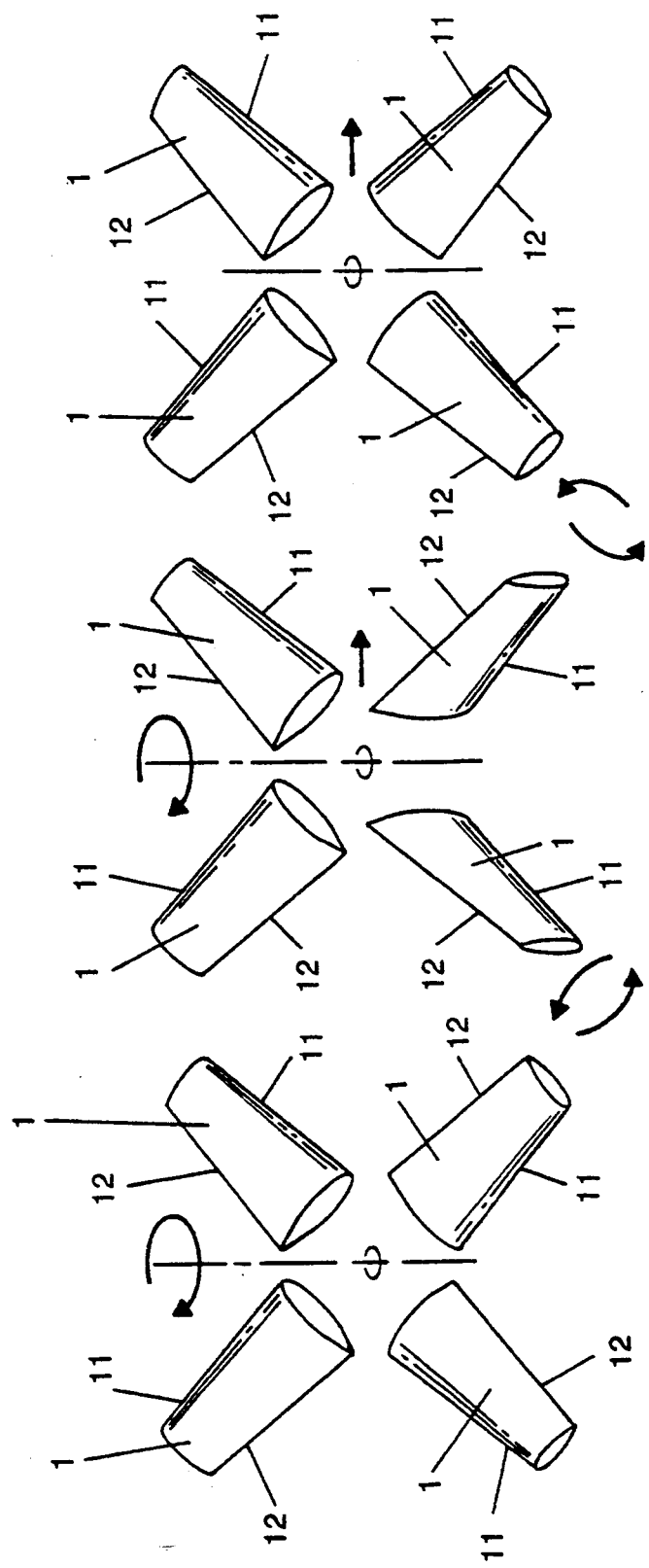

STOPPED ROTOR AIRCRAFT UTILIZING A FLIPPED AIRFOIL X-WING

BACKGROUND—FIELD OF INVENTION

This invention relates to stopped rotor X-wing aircraft that provide low-disk-loading for vertical take off and landing, and stop their rotors to a fixed wing configuration for high speed forward flight.

BACKGROUND—DESCRIPTION OF PRIOR ART

High-speed vertical takeoff and landing aircraft, particularly the tilt-wing, tilt-rotor, stowed-rotor, and X-wing are well known in the aerospace industry. These concepts may be considerably different in design, yet attempt to achieve similar operational goals of vertical takeoff and landing, and high speed forward flight. Large congested cities as well as military operational sites lack nearby landing sites from which fixed wing aircraft can operate from. Conventional helicopters can operate from such sites, but are limited in forward speed and range. Helicopters have high hovering efficiencies due to their low-disk-loading, yet forward speed is limited to about 250 miles/hour. Speed is limited by the advancing (upwind) rotor blade tip speed, which cannot approach or exceed the speed of sound without incurring unacceptably high drag. Current vertical and short takeoff and landing (V/STOL) aircraft designs attempt to have both qualities; efficient hovering and high-speed forward flight. Demonstrated designs appear to be an unsatisfactory compromise between the two.

One known V/STOL aircraft, the tilt-wing, uses large oversized conventional propellers driven by engines. These engines are attached to a wing that can be tilted from the horizontal position for forward flight, and to the vertical position for vertical takeoff and landing. The tilt-rotor, such as the test flown Bell/Boeing V22 Osprey, behaves similarly except that only the rotors and engines tilt; not the wing. These aircraft compromise both hovering efficiency, because of high-disk-loading, and forward speed. When the rotors are tilted forward for forward flight they become inefficient impellers above about 350 miles/hour.

Another concept known as the stowed-rotor behaves like a conventional helicopter for vertical takeoff and landing. For high speed forward flight the rotors are slowly stopped and stowed out of the way of the airstream to reduce drag, while a set of conventional fixed wing airfoils assume primary lift. U.S. Pat. Nos. 3,515,500 to Nachod (1968) and 4,059,247 to Prewitt (1976) show the complexity involved in stopping and folding the rotors. These aircraft have hover efficiencies approaching a helicopter, yet require the additional weight of a fixed wing, as well as complexity and aerodynamic drag of a stowed rotor.

Still another concept known as the stopped rotor X-wing aircraft behaves like a conventional helicopter for vertical takeoff and landing, having low-disk-loading. To achieve high speed forward flight the four main rotor airfoils are slowly stopped and fixed in an "X" position in the horizontal plane, forming 45 degree swept wing angles (two airfoils are forward swept 45 degrees, and the other two airfoils are aft swept 45 degrees). The stopped rotor airfoils provide primary lift for forward flight, eliminating the need for additional fixed wings. Since two of the four main rotor airfoils are essentially flying backwards in the fixed wing position (relative to their rotary wing airfoil position), a complicated air circulation control system is required for each airfoil to achieve lift in both the rotary and fixed wing operation. This causes the airfoil leading edge to be identical to the trailing edge. U.S. Pat. No. 4,711,415 to Binden (1985) uses high pressure air blown over the airfoil leading and trailing edges, via span-wise running slots, to achieve circulation control. The rotor systems research aircraft X-wing (RSRA/X-wing), based on principles of this patent, and built by Sikorsky Aircraft Corporation, was never able to demonstrate rotary wing flight or transition from rotary wing to fixed wing flight, or vise versa. Complexity and number of the mechanisms associated with main rotor airfoil circulation control, and questionable reliability of successfully transitioning between rotary wing and fixed wing flight, and vise versa, caused the program to be abandoned.

OBJECTIVES AND ADVANTAGES

The present invention overcomes the disadvantages, and problems set forth hereinabove. Several objectives and advantages of the present invention are:

(a) to provide a stopped rotor X-wing aircraft with low-disk-loading, for efficient vertical takeoff and landing;

(b) to provide a stopped rotor X-wing aircraft with low drag and high speed forward flight, including aerodynamically efficient supersonic operation;

(c) to provide a stopped rotor X-wing aircraft with simple high ratio lift to drag main rotor airfoils used for both rotary and fixed wing operation by flipping two of the airfoils 180 degrees;

(d) to provide a stopped rotor X-wing aircraft with main rotor airfoils that avoid the need for complex air circulation control, required to maintain operation in the rotary wing, fixed wing, and transition mode therebetween;

(e) to provide a stopped rotor X-wing aircraft with main rotor airfoils that avoid the need for complex air circulation control that requires external power (e.g., turboshaft engine power to drive air compressor);

(f) to provide a stopped rotor X-wing aircraft with main rotor airfoils that avoid complex airfoil geometry changing mechanisms, or contain other aerodynamic inefficiencies caused by the fact that the airfoils have to provide lift at low drag for both the rotary wing and fixed wing flight mode;

(g) to provide a stopped rotor X-wing aircraft that transitions between rotary wing and fixed wing flight mode, and vise versa in a rapid and reliable manner using a counter-rotating flywheel(s) to cancel main rotor inertia, without transferring torque to the main fuselage;

(h) to provide a stopped rotor X-wing aircraft utilizing a variable pitch ducted fan for forward thrust, and integrating a common turboshaft engine(s) for both rotary wing and fixed wing flight.

DRAWING FIGURES

Figure 1:
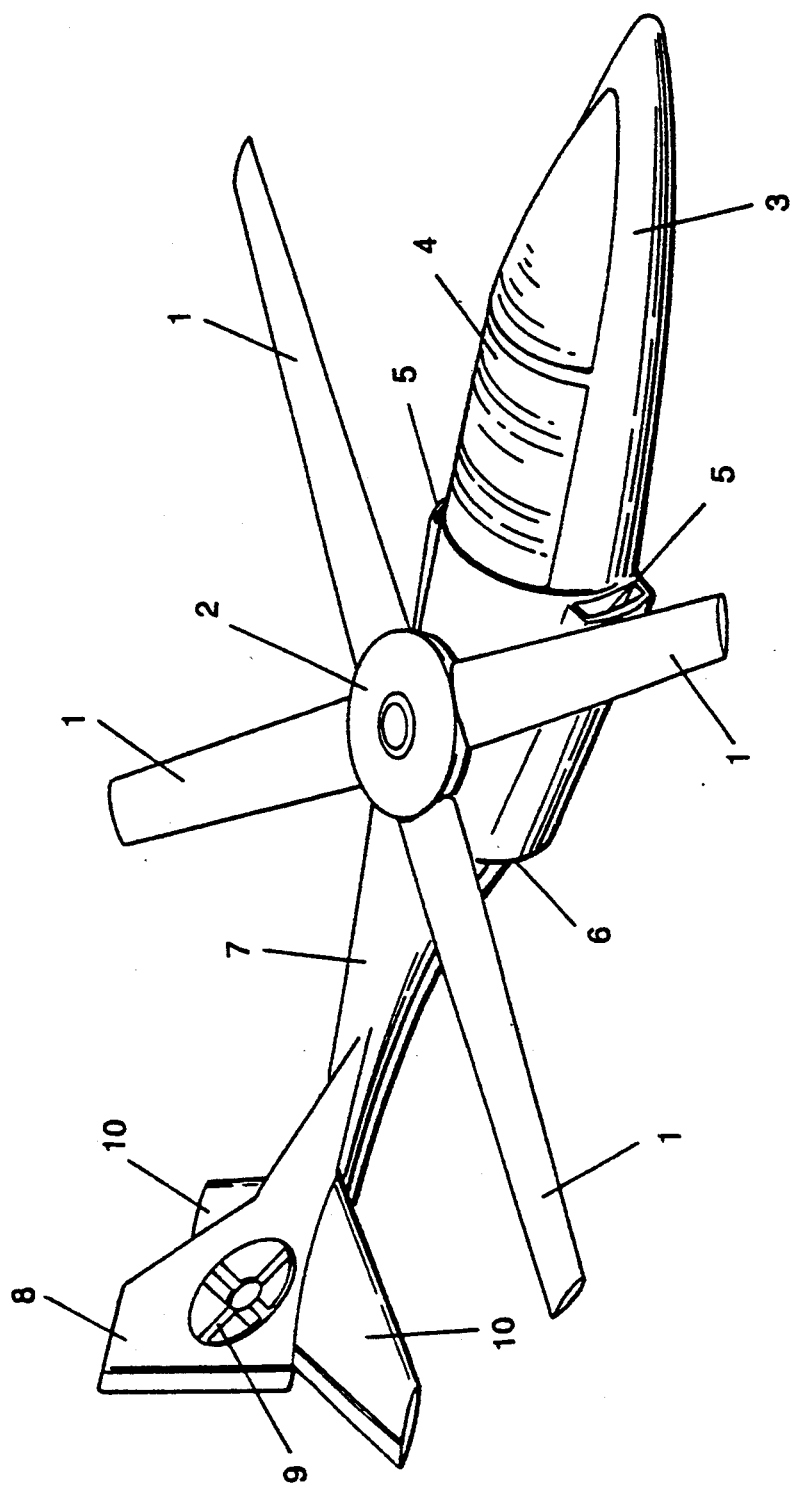
FIG. 1 is a representation of the stopped rotor Flipped Airfoil X-wing (FAX-WING), in the fixed wing configuration.

FIGS. 4, 5, and 6 illustrate the rotary wing, transition, and fixed wing mode of the main rotor airfoils respectively.

| 6. | Reference Numerals in Drawings |
| --- | --- |
| 1 | main rotor airfoil |
| 2 | main hub |
| 3 | main fuselage |
| 4 | cockpit |
| 5 | ducted fan air inlet |
| 5A | variable pitch ducted fan |
| 6 | ducted fan air outlet |
| 7 | tail boom |
| 8 | tail |
| 9 | anti-torque rotor |
| 10 | horizontal stabilizer |
| 11 | leading edge |
| 12 | trailing edge |
| 13 | chord line |
| 14 | torque tube |
| 15 | torque tube bearing |
| 16 | pitch actuation crank |
| 17 | pitch actuation control rod |
| 18 | root-section |
| 19 | tip-section |
| 20 | main shaft |
| 20A | turboshaft power transmission |
| 20B | turboshaft engine |
| 20C | turboshaft power transmission clutch |
| 21 | airfoil flipping actuator |
| 22 | swash plate mechanism |
| 23 | swash plate control rod |
| 24 | flywheel clutch |
| 25 | flywheel mass |
| 26 | flywheel bearing |
| 27 | flywheel spin up/spin down mechanism |
| 28 | computer controlled feedback system |

DESCRIPTION—FIGS. 1 TO 3

Referring to the drawings, FIG. 1 depicts the stopped rotor Flipped Airfoil X-wing (FAX-WING) aircraft in the fixed wing flight mode. Four main rotor airfoils 1 having identical geometry, are equally azimuthal spaced about and attached to the main hub 2. The two forward main rotor airfoils are forward swept 45 degrees, and the two aft main rotor airfoils are aft swept 45 degrees. The main fuselage 3 contains the cockpit 4, two ducted fan air inlets 5, and a single ducted fan air outlet 6, required by the variable pitch ducted fan 5A contained within the fuselage. The tail boom 7 connects the main fuselage to the tail 8 (which contains the anti-torque rotor 9) and the two horizontal stabilizers 10.

Figure 2:
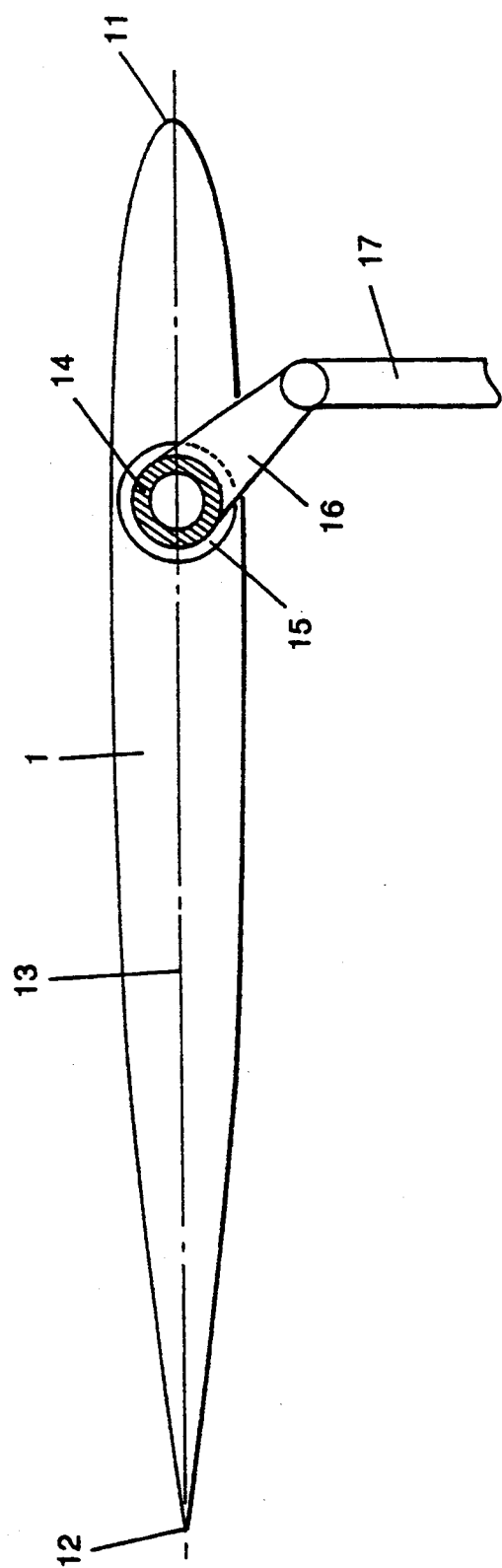
FIG. 2 is a cross-sectional view of an individual main rotor airfoil (at its root-section), showing the symmetrical airfoil and pitch actuation mechanisms.
Figure 3:
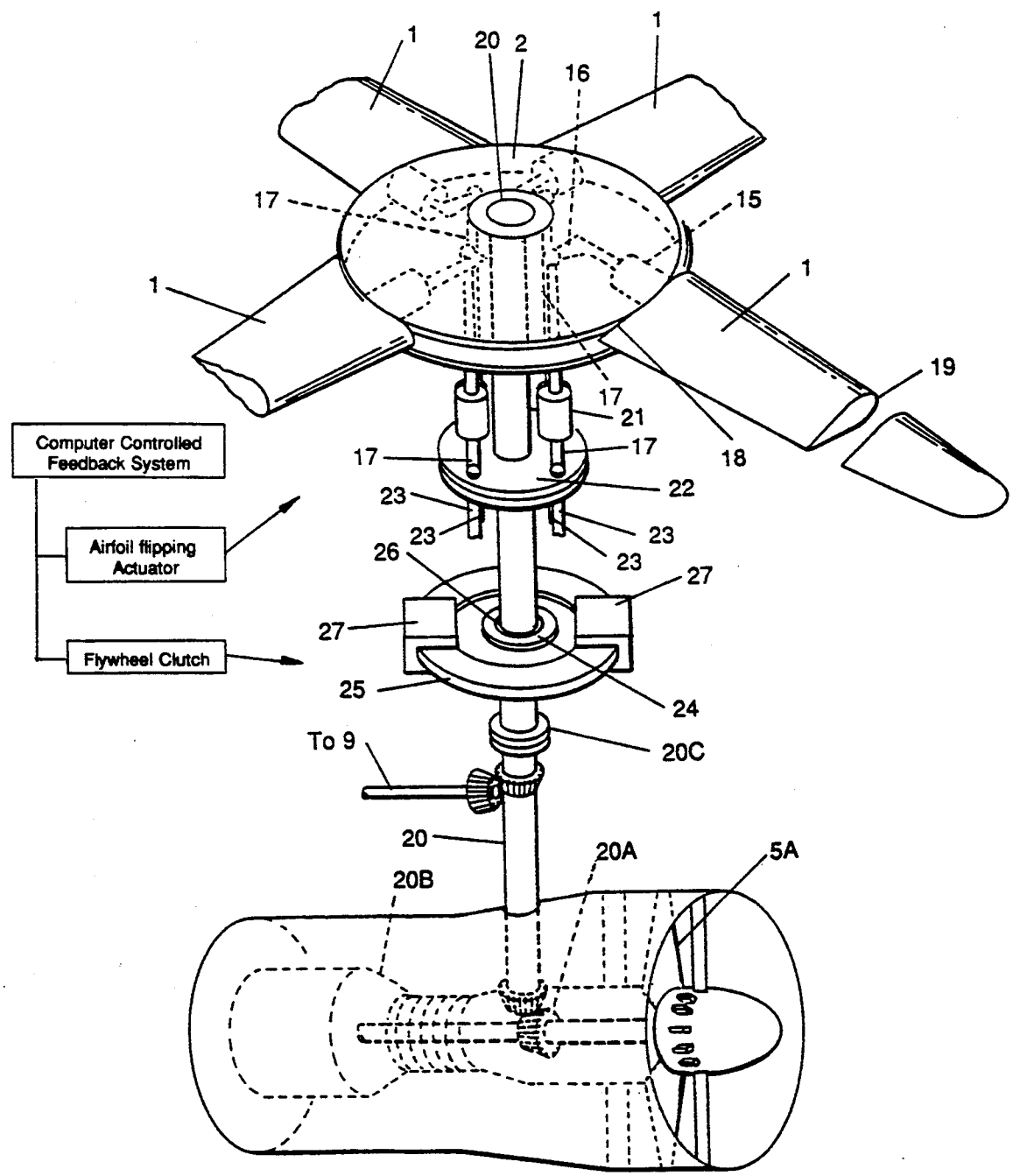
FIG. 3 is a depiction of the airfoil pitch control mechanisms and flywheel mechanisms, that can rapidly spin up and spin down the main rotor airfoils using a rotating inertia flywheel mass.

FIG. 2 is a cross-sectional view of a single main rotor airfoil 1, at its root-section 18 (see FIG. 3). It contains a leading edge 11 and trailing edge 12 (having ten or more times smaller radius of curvature than the leading edge). The airfoil is symmetric about its chord line 13 (dashed line), along the full length of the airfoil; from root-section to tip-section 19 (see FIG. 3). Located approximately one quarter the chord line distance aft of the leading edge, and attached to the airfoil root-section is the torque tube 14. The torque tube bearing 15 couples the torque tube to the main hub 2, but allows free rotational movement about the torque tube centerline (also see FIG. 3). The four torque tubes (one for each main rotor airfoil) are positioned about the main hub, such that all their torque tube centerlines intersect each other at the main shaft 20 centerline (see FIG. 3). The torque tube connects to the pitch actuation control rod 17 via the pitch actuation crank 16, through a rotatable linkage (shown but not numbered).

FIG. 3 is an illustrative view of the stopped rotor drive and conversion system. For simplifying descriptive purposes, not all detail of the main rotor airfoils 1, and their associated pitch actuation mechanisms are shown. Only two of the four pitch actuation control rods 17 located adjacent (90 degrees azimuthal) to each other contain the airfoil flipping actuators 21. These airfoil flipping actuators are attached in series with the pitch actuation control rod. The pitch actuation control rods connect their individual pitch actuation cranks 16 (also see FIG. 2 for clarification) to the swash plate mechanism 22. The swash plate control rods 23 are attached to the bottom half of the swash plate mechanism. The main shaft 20 is rigidly attached to the main hub 2 and flywheel clutch 24. In addition, the main shaft connects to the turboshaft power transmission 20A (shown simplified for purposes of illustration only) at its bottom end. The flywheel mass 25 is located coaxial to, but not attached to the main shaft. It contains a flywheel bearing 26 that is not rigidly attached to the main shaft. Located at the outer circumference of the flywheel mass is the flywheel spin up/spin down mechanism 27.

OPERATION—FIGS 1 TO 6

FIG. 1 depicts the stopped rotor Flipped Airfoil X-wing (FAX-WING) aircraft. This aircraft is envisioned to be capable of three distinct flight modes; rotary wing (FIG. 4), transition (FIG. 5), fixed wing (FIG. 6), as well as the ability to transition between rotary wing and fixed wing flight, and vice versa in a controlled manner. These flight modes are primarily defined by the way main rotor airfoils are operated (e.g. leading edge directions relative to the local airstream direction).

FIG. 4 depicts the FAX-WING rotary wing mode. The rotary wing mode operates virtually the same as a conventional helicopter. The four clockwise (example direction only) rotating main rotor airfoils 1, are positioned such that the oncoming airstream created by the rotating motion of the airfoils, causes the air to flow from their leading edges 11 to their trailing edges 12 (forward aircraft velocity neglected). By individually and collectively changing the four main rotor airfoil's angle of attack (angle between airfoil chord line and oncoming airstream) in a sequenced manner, lift and forward flight can be achieved. The mechanism for changing airfoil angle of attack is shown in FIGS. 2 and 3. FIG. 3 swash plate control rods 23 are actuated such that they vertically translate and/or tilt the swash plate mechanism 22. The bottom half of the swash plate mechanism does not rotate (about the yaw axis), while the top half does rotate (coupled together with bearings) at the angular velocity of the main shaft 20. Swash plate mechanism 188 displacement causes vertical translation of the pitch actuation control rods 17 (the airfoil flipping actuators 21 are not used during rotary wing mode, maintaining a fixed length). They in turn generate rotary motion of the torque tube 14, via the pitch actuation crank 16 (also see FIG. 2). Rotating the torque tube effects changes in angle of attack (pitch angle) of the main rotor airfoils. The torque tube is constrained such that it can only rotate about its individual torque tube bearing 15 (i.e., torque tube centerline). This bearing transfers all flight loads from the main rotor airfoils to the main shaft 20 via the main hub 2. The connector (not shown) located between each torque tube bearing and the main hub contains articulation and dampening devices to accommodate rotary wing dynamic behavior. FIG. 1 depicts the anti-torque rotor 9 which cancels main rotor airfoil 1 torque during the rotary wing mode (FIG. 4), as well as provide directional yaw authority. The tail 8 and horizontal stabilizers 10, having control surfaces, can also aid in directional control during forward flight. These control surfaces replace the function of the anti-torque rotor in the fixed wing flight mode (FIG. 6). To increase forward speed while in the rotary wing mode, available power from the turboshaft engine 20B, not required by the stopped rotor airfoils or anti-torque rotor, may be transferred to the variable pitch ducted fan 5A. The variable pitch blades are rotated to high angles of attack, producing forward thrust. Transferring torque to the ducted fan and the main shaft simultaneously requires computer flight control algorithms that avoid undesirable resultant torques to the aircraft (ex., large pitching moments).

FIG. 6 depicts the FAX-WING main rotor airfoils 1 in the fixed wing (stationary, non rotating) mode. This configuration (also shown in FIG. 1) reflects the flying mode of a conventional fixed wing aircraft, with the exception of having four swept airfoils with all leading edges positioned forward. Primary lift is achieved by the stationary main rotor airfoils, while forward thrust is provided by the turboshaft engine driving the variable pitch ducted fan. To provide forward thrust, the variable pitch ducted fan blades are pitched at high angles of attack. They cause air to be drawn into the ducted fan air inlets 5 and to be ejected out of the ducted fan air outlet 6 with increased momentum (see FIG. 1). In a preferred embodiment (especially for supersonic flight capability), the turboshaft engine core would be centered within the air duct. The air duct connects air inlets to the air outlet (single engine design discussed for simplifying description only). The variable pitch ducted fan blades span from the engine core outer diameter, to the air duct inner wall diameter. This configuration is representative of a high bypass turbofan. Supersonic flight capable propulsion requires supersonic air inlets, converging-diverging nozzle air outlet, and possibly thrust augmentation via an after burner. Fuselage geometry (e.g., area ruling), main rotor airfoils, etc., would also reflect designs for supersonic flight. Basic design operation, however, remains the same for both subsonic and supersonic aircraft.

Control surfaces located on the tail 8 and horizontal stabilizer 10 surfaces allow for directional control (see FIG. 1). Non rotating main rotor airfoils can also adjust their angles of attack to effect rapid roll and pitching movements. FIG. 6 shows that the main rotor airfoils form 45 degree swept angles (two airfoils are forward swept 45 degrees, and the other two airfoils are aft swept 45 degrees). The four main rotor airfoils are positioned 90 degrees equally azimuthal from each other. All four leading edges 11 are positioned forward such that the air stream created by the forward motion, of the aircraft causes the air to flow from their leading edges to trailing edges 12.

FIG. 5 depicts the FAX-WING in the transition mode. The transition mode is used to convert from the rotary wing mode (FIG. 4) to the fixed wing mode (FIG. 6) and vise-versa. To convert from rotary wing mode to fixed wing mode, the rotating main rotor airfoils 1 are abruptly stopped and locked into position, such that the main rotor airfoils form 45 degree swept angles (two airfoils are forward swept 45 degrees, and the other two airfoils are aft swept 45 degrees). During transition mode, two adjacent retreating airfoils are flipped 180 degrees about their torque tube 14 centerlines, such that all main rotor airfoil leading edges 11 are forward facing by the time the main rotor airfoils cease their rotary motion. The symmetric airfoil (about its chord line 13) design allows it to be geometrically and aerodynamically indistinguishable from the other two non flipped airfoils for, both rotary wing and fixed wing flight modes.

The transition mode, for rotary wing to fixed wing flight conversion, begins with the aircraft in the rotary wing mode (see FIG. 4), flying forward at approximately 150 miles per hour, with the main rotor airfoils rotating at approximately 3.5 revolutions per second. The main shaft 20 is first decoupled from the turboshaft engine via the turboshaft power transmission clutch 20C and available power is reserved for the ducted fan to produce forward thrust.

The flywheel mass 25, previously spun up (rotating in the opposite direction of the main rotor airfoils) by the flywheel spin up/spin down mechanism 27, is engaged to the main shaft via the flywheel clutch 24. The flywheel clutch transfers torque (at controlled and varying magnitude levels) to the main shaft to spin down and stop main rotor airfoil rotation. The flywheel mass, prior to engagement by the flywheel clutch, has approximately 1.25 times the angular momentum, in the opposite direction, of the spinning main rotor airfoils. Angular de-acceleration of the main rotor airfoils by flywheel clutch engagement is directed by a computer controlled feedback system 28 in concert with the flight control algorithms. This computer feedback system utilizing torque, angular velocity and position sensors, assures main rotor airfoils come to rest in the proper 45 degree swept angles (two airfoils are forward swept 45 degrees, and the other two airfoils are aft swept 45 degrees). When the main rotor airfoils come to rest, the still rotating flywheel mass is decoupled, and the main rotor airfoils are locked into position, preventing further rotary motion. The locking mechanism (not shown) may consist of a simple pin and circumferential slot. The pin (affixed to a stationary part of the fuselage) is inserted into the slot (integral to the main hub) when the airfoils come to rest at the 45 degree swept position. The slot would contain self aligning springs or other mechanisms to dampen and correct for any positional error.

The counter-rotating flywheel mass allows the main rotor airfoils to be rapidly stopped, in approximately 1 second, minimizing transition time and loss of aircraft altitude. Flywheel inertia cancels main rotor airfoil inertia, eliminating torque loads on the fuselage. The magnitude of torque required to stop the main rotor airfoils rapidly (in approximately 1 second), greatly exceeds the torque that the anti-torque rotor 9 could provide.

During the rotary wing to fixed wing transition, two adjacent main rotor airfoils are rotated (i.e., flipped) 180 degrees about their individual torque tube 14 centerlines, causing all four airfoils to be in the fixed wing position (FIG. 6) by the time transition to fixed wing mode is complete. Flipping the two main rotor airfoils is initiated by the airfoil flipping actuator 21. The airfoil flipping actuator in a preferred embodiment would be electrically energized. It would consist of a solenoid or electric motor driven linear actuator; containing a linear potentiometer or other device for position determination. Many main rotor airfoil flipping scenarios are possible in terms of flipping rate and flipping position within the 360 degree airfoil sweep angle.

In a preferred embodiment, the airfoil flipping actuator does not provide primary torque to flip the airfoils 180 degrees. The airfoils flip by themselves during their retreating (down wind) phase when they are essentially flying backwards (i.e., predominant airflow over them is from trailing edge to leading edge). The retreating phase is defined as airfoil rotation (about main hub) from the aircraft fuselage nose to the aircraft tail. The advancing (up wind) phase is defined as airfoil rotation from the tail to the nose. Air flow over advancing airfoils is increased by superposition of the aircrafts forward velocity and the angular velocity of the airfoil. The opposite is true for the retreating airfoil which has reduced air flow over its airfoil by superposition of the aircraft forward velocity and angular velocity of the airfoil. By coordinating forward aircraft velocity and airfoil angular velocity, the majority of airflow over the retreating airfoil can be made to flow from trailing edge to leading edge (air velocity change along the rotating airfoil span, as a function of radius, is accounted for). During this retreating phase the airfoil flipping actuator rotates the airfoil approximately 20 degrees. This causes the airfoil to create lift in the region where air flows from trailing edge to leading edge. This lift generates sufficient torque (center of lift is offset from torque tube) about the torque tube 14 to cause the airfoil to flip through a total of 180 degrees. This torque generated by the inboard portion of the airfoil is of sufficient magnitude to overcome a counteracting torque generated by the outboard portion of the airfoil that may have air flowing from leading edge to trailing edge. The 180 degree airfoil flipping motion is accomplished in approximately 1/16 second.

Minimizing aerodynamic induced structural loads on the flipping main rotor airfoils can be achieved in one or more of several ways including; stalling the airfoil (reduces aerodynamic lift), flipping airfoil rapidly (reduces large frontal area exposure time, hastens flow separation), flipping airfoil while on the retreating side of rotary motion (the retreating side is where the airfoil travels forward to aft, in the same relative direction as the oncoming airstream created by the forward motion of the aircraft), causing reduced and/or reversed air velocity over the airfoil, and initiating flipping sometime after angular velocity of the system has been reduced by flywheel mass engagement. In a preferred embodiment the main rotor airfoils are to be fabricated from graphite/epoxy composite materials. Composite materials are particularly advantageous for their high specific strength and high specific stiffness. Light weight airfoils reduce flywheel mass because of a lower spin inertia requirement. High torsional stiffness adds to structural integrity and dimensional stability of the airfoils during flipping. It also eliminates tip divergence of the stationary 45 degree forward swept airfoils that might otherwise twist, increasing angle of attack under aerodynamic lift loads.

At completion of the transition mode the flywheel spin up/spin down mechanism 27 is disengaged from the main shaft and slowly spun down, reversed in direction, and spun up (may also be completely stopped between transitions to avoid undesirable gyroscopic effects). Once spun up it is ready to perform a fixed wing to rotary wing transition. Torque produced during the spin up and spin down of the flywheel mass is compensated by the anti-torque rotor and/or the tail control surfaces, depending on flight mode.

When the aircraft is transitioning from fixed wing mode to rotary wing mode the rotating flywheel mass would be engaged in a similar reversed sequence. The stopped rotor airfoils would be rapidly brought from their fixed wing stationary position to the rotary wing mode (in approximately 1 second). During this period two adjacent airfoils would be flipped 180 degrees about their torque tubes. Flipping scenarios would be similar to the rotary wing to fixed wing transition strategies. Once the main rotor airfoils were brought up to the correct rotary speed, the turboshaft power transmission clutch would be engaged to the main shaft and the aircraft would then assume rotary wing flight mode.

In a more preferred embodiment, the aircraft would contain two separate flywheel masses (only one shown for simplicity of illustration), each rotating in opposite directions and having 1.25 times the angular momentum than the rotating main rotor airfoils. The addition of a second flywheel mass would facilitate rapid transition to and from (and back again, without waiting for the single flywheel to recycle) the rotary wing and fixed wing modes. This would not require the single flywheel spin up/spin down mechanism (shown) to perform the spin up and spin down maneuvers in both directions. One flywheel mechanism would be dedicated to conversion from fixed wing to rotary wing mode, while the other would be dedicated to the conversion from rotary wing to fixed wing mode. The flywheel mass, diameter and peak rotation velocity would be approximately 100 lbs, 4 ft, and 625 revolutions per second respectively. This is the approximate size required for a 7,500 lb class FAX-WING aircraft having a 32 ft. diameter main rotor span. Larger vehicles would have correspondingly larger masses and dimensions.

The spin up mechanism can effect angular momentum in the flywheel mass 25 through electrical, mechanical, or pneumatic means; where electrical is the more preferred embodiment. The electrical method is based on electric motor operation. It allows for light weight and accurate flywheel rotation. The flywheel mass is configured to act as an electric motor rotor (containing magnetic coils), while the spin up/spin down mechanism (also containing coils), acts as an electric motor stator. Magnetic fields generated by these electric coils (not shown) embedded in the spin up/spin down mechanism would cause the flywheel mass, containing the rotor, to spin up or spin down. The mechanical method would utilize a power drive engagement from the turboshaft engine to spin up or spin down the flywheel mass. The pneumatic method would use pressurized air passing through a turbine wheel attached to the flywheel mass to spin up or spin down the flywheel mass.

The flywheel clutch can couple the flywheel mass to the main shaft 20 through friction, hydraulic, or magnetic field coupling, or a combination thereof, where magnetic field coupling (e.g., magnetic brake)is the more preferred embodiment. Magnetic field couple braking would be accomplished through the use of opposing magnetic fields; using pairs of adjacent magnetic coils (not shown). One half of the pair of magnetic coils is contained in the flywheel clutch, while the other half is contained in the flywheel mass. An arrangement where the spin up/spin down magnetic coils and magnetic field coupling brake systems are combined to reduce weight and complexity is also possible. Friction braking would be accomplished through torque transferring between contacting surfaces, while the hydraulic method would utilize hydraulic clutching (fluid coupling) between surfaces.

Although the description above contains many specificities, these should not be construed as limiting the scope of the invention but merely providing illustrations of some of the presently preferred embodiments of this invention.

I claim:

1. A stopped rotor aircraft capable of fixed wing flight, rotary wing flight, and the ability to transition therebetween said flight modes, from fixed wing flight to rotary wing flight, as well as rotary wing flight to fixed wing flight, in a controlled manner, wherein the improvement comprises:
   (a) one or more flywheel masses, having their rotational axis parallel to the main rotor airfoils axis of rotation,
   (b) one or more flywheel spin up/spin down mechanisms,
   (c) one or more flywheel clutches,
   (d) means of coupling said flywheel mass to said flywheel spin up/spin down mechanism, allowing the spin up/spin down mechanism to impart angular momentum to the flywheel mass, and a means of coupling the flywheel mass to the main rotor airfoils, to effect spinup or spindown of the main rotor airfoils in approximately one second, via a means of one or more flywheel clutches.

2. The flywheel spin up/spin down mechanism of claim 1 wherein means of coupling said mechanism and imparting angular momentum to said flywheel mass by means of one or more in combination thereof the following: means through an electric motor, including magnetic field coupling, wherein pairs of adjacent magnetic coils, one half pair contained in the flywheel mass, and the other half contained in the flywheel spin up/spin down mechanism, mechanical means through engagement of the turboshaft engine, pneumatic means through pressurized air passing through a turbine wheel that is attached to the flywheel mass.

3. The flywheel clutch of claim 1 wherein a means of coupling said clutch between said flywheel mass and said main rotor airfoils, which includes one or more in combination thereof the following: means through friction contacting surfaces where one surface is connected to the flywheel mass and the other, through a means, is connected to the main rotor airfoils, means through hydraulic shear of viscous fluid located between two viscous coupling devices, where the first said coupling device is connected to the flywheel mass, and the second said coupling device is connected, through a means, to the main rotor airfoils, means through magnetic field coupling, wherein pairs of adjacent magnetic coils, one half pair contained in the flywheel mass, and the other half connected, through a means, to the main rotor airfoils.

4. The stopped rotor aircraft of claim 1 wherein a means of coupling one or more turboshaft engines to one or more variable pitch ducted fans, and a means of coupling the two aforementioned to the main rotor airfoils; allowing a means of transferring turboshaft engine power to the variable pitch ducted fans and also to the main rotor airfoils.

5. The stopped rotor aircraft of claim 1 wherein a means of coupling a computer controlled feedback system, in concert with flight control algorithms, to said aircraft flywheel clutch, effecting the transition maneuver from fixed wing flight to rotary wing flight, and said rotary wing flight to said fixed wing flight, in a controlled manner.

6. A stopped rotor aircraft capable of fixed wing flight, rotary wing flight, and the ability to transition therebetween said flight modes, from fixed wing flight to rotary wing flight, as well as rotary wing flight to fixed wing flight, in a controlled manner, wherein the improvement comprises:
   (a) a plurality of equal azimuthal spaced main rotor airfoils,
   (b) airfoil flipping actuators, wherein a means of rotating main rotor airfoils about their individual angle of attack rotation axis,
   (c) means of connecting each individual said plurality of main rotor airfoils to a corresponding individual said airfoil flipping actuator, such that the airfoil can rotate about its individual angle of attack rotation axis, whereby the main rotor airfoils can rotate approximately 180 degrees about their individual angle of attack rotation axis.

7. The plurality of said equally azimuthal spaced main rotor airfoils of claim 6 wherein, the number of main rotor airfoils is four, whereby a means of positioning the main rotor airfoils, for the fixed wing flight mode, such that they are positioned approximately 45 degrees forward and aft swept relative to the aircraft centerline.

8. The plurality of said equally azimuthal spaced main rotor airfoils of claim 6 wherein the airfoils have leading edge radius of curvature that is approximately ten times greater than the trailing edge radius of curvature, and an approximate symmetric airfoil cross-section about the airfoil chord line.

9. The stopped rotor aircraft of claim 6 wherein a means of coupling one or more turboshaft engines to one or more variable pitch ducted fans, and a means of coupling the two aforementioned to the main rotor airfoils; allowing a means of transferring turboshaft engine power between the variable pitch ducted fans and the main rotor airfoils.

10. The stopped rotor aircraft of claim 6 wherein a means of coupling a computer feedback system, in concert with flight control algorithms, to said aircraft airfoil flipping actuators, effecting the transition maneuver from said fixed wing flight to said rotary wing flight, as well as from said rotary wing flight to said fixed wing flight, in a controlled manner.

11. The stopped rotor aircraft of claim 1 and claim 6, containing the embodiments of both said claims, providing a means such that the aircraft can transition from said fixed wing flight to said rotary wing flight, as well as from said rotary wing flight to said fixed wing flight, in a controlled manner.

* * * * *